United States Patent

Delcloy et al.

Patent Number: 5,885,913
Date of Patent: Mar. 23, 1999

[54] PREFABRICATED PART MADE OF VITREOUS FUSED SILICA FOR USE AS A REFRACTORY AND PROCESS FOR PRODUCING SUCH PREFABRICATED PARTS

[75] Inventors: Jean-Marie Delcloy, Calais; Jean-Marc Leroy, Dunkerque, both of France; Edmund Goerenz, Alsdorf-Hoengen, Germany

[73] Assignee: Lichtenberg Feuerfest GmbH, Düsseldorf, Germany

[21] Appl. No.: 505,743

[22] Filed: Jul. 24, 1995

Related U.S. Application Data

[63] Continuation of PCT/DE94/00004 Jan. 5, 1994 published as WO94/17009 Aug. 4, 1994.

[30] Foreign Application Priority Data

Jan. 23, 1993 [DE] Germany .......................... 43 01 846.7

[51] Int. Cl.$^6$ ...................................... C03C 3/00
[52] U.S. Cl. ............................. 501/54; 501/44; 501/133; 106/692
[58] Field of Search ............................ 501/54, 128, 129; 106/692

[56] References Cited

U.S. PATENT DOCUMENTS

| | | | |
|---|---|---|---|
| 2,895,839 | 7/1959 | George | 501/54 |
| 2,958,604 | 11/1960 | George | 501/54 |
| 3,814,613 | 6/1974 | Hubble | 501/131 |
| 4,135,939 | 1/1979 | Campana | 501/129 |
| 4,162,179 | 7/1979 | Campana | 501/129 |
| 4,230,498 | 10/1980 | Rueckl | 501/119 |
| 4,259,120 | 3/1981 | Rueckl | 501/96 |

*Primary Examiner*—Mark L. Bell
*Assistant Examiner*—Louis Troilo
*Attorney, Agent, or Firm*—John Lezdey

[57] ABSTRACT

A prefabricated part made of vitreous fused silica for use as a refractory, and in particular, for use in repairing coke ovens, which contains over 90% by weight of $SiO_2$. The prefabricated part includes about 20 to 50% by weight of vitreous fused silica having 1 to 6 mm grain size, 20 to 40% by weight of vitreous fused silica having 0.1 to 1 mm grain size, 15 to 35% by weight of finely ground vitreous fused silica having grains less than 0.1 mm in size, 1 to 10% of finely ground vitreous fused silica having a specific surface area according to BET larger than 20 $m^2$ per gram, 1 to 10% by weight of cement and 0.1 to 8% by weight of a phosphorous compound.

19 Claims, No Drawings

PREFABRICATED PART MADE OF VITREOUS FUSED SILICA FOR USE AS A REFRACTORY AND PROCESS FOR PRODUCING SUCH PREFABRICATED PARTS

This is a continuation of International Application PCT/DE94/00004, with an international filing date of Jan. 5, 1994.

BACKGROUND OF THE INVENTION

1. Field of the Invention

The invention relates to a precast element of quartz and to a method for producing such a precast element.

2. Description of the Prior Art

A refractory brick material for coke ovens of the type mentioned initially is well-known from the German published application 29 47 182. It consists predominantly of $SiO_2$ and a binding agent, it is suitable for mould-cast bricks and preferably for coke-oven walls produced in one piece.

Precast elements of the type mentioned initially can generally be employed at very high temperatures. In the ceramics industry they are used, for example, as kiln furniture, in the glass industry they are employed in regions which are not in contact with the molten glass, e.g. as curtain bricks.

In the case of the precast element of quartz of the type mentioned initially being used in coke ovens, it is desirable that the creep under pressure at high temperatures be as low as possible. In practical operation the partition walls of coke ovens built of precast elements of quartz of the type mentioned initially are pressure-loaded from above, among other things by the weight of the fully-loaded charging car. Moreover the stability under temperature change of the precast element should be as high as possible. In practical operation the hot partition walls come into renewed contact with cold wet coal with every charge, at decharging a cold-air shock occurs. Furthermore abrasion of the precast element should be low. Finally, use of the precast element in coke ovens requires good heat transmission, i.e. best possible thermal conductivity.

This is where the invention comes into its own. It has the object, under consideration of the above-mentioned requirements, to further develop the initially mentioned precast element of fused quartz in such a way that it can be produced conveniently and cheaply and contains as large as possible a fraction of amorphous $SiO_2$.

SUMMARY OF THE INVENTION

This object is achieved by a precast element of fused quartz characterized in being composed of 20 to 50 percent in weight of quartz with a grain size from 1 to 6 mm, 20 to 40 percent in weight of quartz with a grain size from 0.1 to 1 mm, 15 to 35 percent in weight of finely-ground quartz with 100% of the grains being smaller than 0.1 mm, 1 to 10% of pulverized quartz with a specific surface area according to BET greater than 20 $m^2$ per gramme, 1 to 10 percent in weight of cement and 0.1 to 8 percent in weight of a phosphoric compound, in particular sodium polyphosphate.

Focusing on the method, the object is achieved by the four fractions of quartz first being dry mixed with the cement and the phosphoric compound; then a quantity of mixing water corresponding to 5 to 10%, preferably 7% of the weight of the dry mixture is added and mixed for several minutes, preferably 5 minutes, until homogeneous; then the pasty material is filled into a mould.

DESCRIPTION OF THE PREFERRED EMBODIMENTS

The present invention includes a precast element of fused quartz that is composed of varying percentages of quartz having different grain sizes as illustrated in the following table:

| | (Compositions of Fused Quartz) (>90% $SiO_2$) | | |
|---|---|---|---|
| Grain Size (mm) | Wt. (%) | Preferable Wt. (%) | Most Preferable Wt. (%) |
| 1.0–6.0 | 20–50 | 25–45 | 30–44 |
| 0.1–1.0 | 20–40 | 25–32 | 28–32 |
| <0.1 | 15–35 | 20–30 | 22–26 |
| pulverized (BET specific surface area >20 $m^2$/g) | 1–10 | 1–8 | 3–6 |
| Other Components | | | |
| cement | 1–10 | 1–8 | 2–6 |
| phosphoric compound | 0.1–8.0 | 0.1–5.0 | 0.1–3.0 |

Advantageously, the phosphoric compound contains sodium polyphosphate.

The phosphoric compound and the cement yield a binding system in which the refractory matrix of the four fractions of quartz resides. The fraction of binding agent is kept intentionally low in order to attain as high as possible a content of $SiO_2$ in the precast element. The mixture for a precast element according to the invention is referred to in English as "low cement castable". The mixture of the four fractions of quartz leads to a volume which on one hand is firm and on the other adequately filled. Strength is achieved through the relatively large grains in the grain size range from 1 to 6 mm. The pulverized quartz is highly disperse and spherical, in a similar way to a lubricant it results in a particularly good commixture of the fractions of the quartz. The finely-ground quartz and the quartz in the grain-size range from 0.1 to 1 mm fills the spaces between the coarse grains, i.e. the quartz with a grain size range from 1 to 6 mm, resulting for the main part in hair-fine capillaries without significant pore spaces between the grains of quartz in the precast element. The binding system of cement and the phosphoric compound, which is preferably a sodium polyphosphate, is chosen and adjusted so that the precast elements are of sufficient strength to allow removal from the mould, transport, and the erection of a partition wall under application of intermediate layers of mortar. As soon as the precast elements are then brought to working temperature, a sinter process begins, binding the fractions of quartz together such that the binding agent of cement and the phosphoric compound is actually no longer necessary.

The precast elements of quartz produced according to the invention exhibit a bulk density greater than 1.7 g per $m^3$, preferably greater than 1.8 g per $m^3$. The open porosity is under 18 percent in volume, preferably under 14 percent in volume. The precast elements show excellent cold compression strength exceeding 30 MPa over the entire temperature range between 110° C. and 1500° C. The compression strength in the temperature range between 1000° C. and 1200° C. is above 60 MPa.

The creeping behaviour under pressure is also favourable for use in the partition walls of coke ovens. At 1200° C. and under a load of 0.5 MPa no creep could be measured between the fifth and twenty-fifth hour of operation. Abrasion corresponds to the ASTM standard.

Precast elements of fused quartz according to the invention have the qualities of pure fused quartz, however their production is more economical and significantly faster due to the additional binding system. Essentially the precast elements are thermically neutral and thus have practically no thermal expansion, in particular in the region of 1000° C. their thermal expansion is negligible. In production of the precast elements care must be taken to minimise tainting by impurities. Impurities can cause a decline in the refractory qualities and would also effect the physical properties.

A cement of as high quality as possible is used as cement, in particular a Ca-aluminate, which typically consists of 80 percent in weight $Al_2O_3$ and 20 percent in weight $CaO$.

According to the invention precast elements can be produced as in the patent application P 42 44 547.7.

Chemically the precast elements according to the invention can be characterised as follows:

| | |
|---|---|
| $SiO_2$ | 92 to 99.5% |
| $Al_2O_3$ | 0.1 to 8.0% |
| $Fe_2O_3$ | max. 0.2% |
| $P_2O_5$ | 0.01 to 1.0% |
| $CaO$ | 0.1 to 2.0% |

All values are in percent in weight.

What is claimed is:

1. A precast element of fused quartz for application at high temperatures having a content of about over 90 percent in weight of $SiO_2$ comprising about 20 to 50 percent in weight of quartz having a grain size from about 1 to 6 mm, 20 to 40 percent in weight of quartz having a grain size from about 0.1 to 1 mm, 15 to 35 percent in weight of finely-ground quartz having a grain size smaller than 0.1 mm, 1 to 10 percent of pulverized quartz having a specific surface area according to BET greater than 20 m² per gram, 1 to 10 percent in weight of cement and 0.1 to 8 percent in weight of a phosphoric compound.

2. A precast element of fused quartz according to claim 1, wherein said fused quartz comprises 25 to 45 percent in weight of quartz having a grain size from about 1 to 6 mm, 25 to 32 percent in weight of quartz having a grain size from about 0.1 to 1 mm, 20 to 30 percent in weight of finely-ground quartz having a grain size smaller than 0.1 mm, 1 to 8 percent of pulverized quartz having a specific surface area according to BET greater than 20 m² per gram, 1 to 8 percent in weight of cement and 0.1 to 5.0 percent in weight of a phosphoric compound.

3. A precast element of fused quartz according to claim 1 wherein said fused quartz comprises 30 to 44 percent in weight of quartz having a grain size from about 1 to 6 mm, 28 to 32 percent in weight of quartz having a grain size from about 0.1 to 1 mm, 22 to 26 percent in weight of finely-ground quartz having a grain size smaller than 0.1 mm, 3 to 6 percent of pulverized quartz having a specific surface area according to BET greater than 20 m² per gram, 2 to 6 percent in weight of cement and 0.1 to 3 percent in weight of a phosphoric compound.

4. A precast element of fused quartz according to claim 1, wherein the dry density of said fused quartz is greater than 1.7 g per cm³.

5. A precast element of fused quartz according to claim 1, wherein the open porosity of said fused quartz is less than 18 percent in volume.

6. A precast element of fused quartz according to claim 1, wherein the cold compression strength of said fused quartz exceeds 30 MPa over the temperature range between 110° C. and 1500° C.

7. A precast element of fused quartz according to claim 1, wherein said cement comprises a calcium-aluminate.

8. A precast element of fused quartz according to claim 1, wherein said phosphoric compound comprises sodium polyphosphate.

9. A precast element of fused quartz according to claim 4, wherein the dry density of said fused quartz is greater than 1.8 per cm³.

10. A precast element of fused quartz according to claim 5, where the open porosity of said fused quartz is less than 14 percent in volume.

11. A precast element of fused quartz according to claim 6, wherein the cold compression strength of said fused quartz exceeds 60 MPa over the temperature range between 1000° and 1200° C.

12. A precast element of fused quartz according to claim 7, wherein said calcium-aluminate consists of about 80 percent in weight of $Al_2O_3$ and about 20 percent in weight of $CaO$.

13. A precast element of fused quartz according to claim 1, wherein said fused quartz comprises about 92% to 99.5% in weight of $SiO_2$, about 0.1% to 8.0% in $Al_2O_3$, about 0.01% to 0.20% of $Fe_2O_3$, about 0.01 to 1.00% of $P_2O_5$ and about 0.1% to 2.0% of $CaO$.

14. A method of producing a precast element of fused quartz for application at high temperatures having a content of about over 90 percent in weight of $SiO_2$ comprising about 20 to 50 percent in weight of quartz having a grain size from about 1 to 6 mm, 20 to 40 percent in weight of quartz having a grain size from about 0.1 to 1 mm, 15 to 35 percent in weight of finely-ground quartz having a grain size smaller than 0.1 mm, 1 to 10 percent of pulverized quartz having a specific surface area according to BET greater than 20 m² per gram, 1 to 10 percent in weight of cement and 1.0 to 8 percent in weight of a phosphoric compound, said method comprising the steps of:

a) dry mixing said four fractions of quartz, said cement and said phosphoric compound in a container to form a composite;

b) adding and mixing in about 5% to 10% in weight of water to the composite of step (a) to form a homogeneous paste material; and c) filling the paste material of step (b) into a mould to form said precast element of fused quartz.

15. A method according to claim 14, wherein said moulding in step (c) is carried out by vibratory compaction.

16. A method according to claim 14, wherein said filled moulds in step (c) are dried at 400° C. for several hours.

17. A method according to claim 16, wherein said filled moulds are slowly raised to the given temperature so that the surface does not close before the water has escape resulting in said precast element of fused quartz having capillaries open to the surface.

18. A method according to claim 14, wherein said water in step (b) consists of about 7% in weight.

19. A method according to claim 14, wherein said filled moulds in step (c) are dried at 400° C. for twelve to twenty-four hours.

* * * * *